(12) United States Patent
Meder

(10) Patent No.: US 10,309,563 B2
(45) Date of Patent: Jun. 4, 2019

(54) DRIVE UNIT, INTERNAL COMBUSTION ENGINE, SPACER ELEMENT FOR A FLUID LINE ARRANGEMENT, AND TOOL KIT FOR MOUNTING A SPACER ELEMENT

(71) Applicant: Bayerische Motoren Werke Aktiengesellschaft, Munich (DE)

(72) Inventor: Andreas Meder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 622 days.

(21) Appl. No.: 15/062,483

(22) Filed: Mar. 7, 2016

(65) Prior Publication Data
US 2016/0186903 A1    Jun. 30, 2016

Related U.S. Application Data

(63) Continuation of application No. PCT/EP2014/073542, filed on Nov. 3, 2014.

(30) Foreign Application Priority Data

Nov. 12, 2013   (DE) .......................... 10 2013 223 018

(51) Int. Cl.
*F01L 9/02* (2006.01)
*F16L 21/06* (2006.01)
(Continued)

(52) U.S. Cl.
CPC .............. *F16L 21/06* (2013.01); *F01L 1/047* (2013.01); *F01M 9/10* (2013.01); *F01M 9/106* (2013.01);
(Continued)

(58) Field of Classification Search
CPC ................... F01L 2810/02; F01L 1/047; F01L 2001/0475; F16L 21/06; F01M 11/02
(Continued)

(56) References Cited

U.S. PATENT DOCUMENTS

| 4,949,683 A | 8/1990 | Swars |
| 5,273,007 A | 12/1993 | Ampferer |
(Continued)

FOREIGN PATENT DOCUMENTS

| DE | 30 40 644 A1 | 5/1981 |
| DE | 38 03 685 A1 | 8/1989 |
(Continued)

OTHER PUBLICATIONS

International Search Report (PCT/ISA/210) issued in PCT Application No. PCT/EP2014/073542 dated Feb. 12, 2015 with English translation (five pages).
(Continued)

*Primary Examiner* — Ching Chang
(74) *Attorney, Agent, or Firm* — Crowell & Moring LLP

(57) ABSTRACT

A drive unit, in particular an internal combustion engine, has a fluid line arrangement, wherein the fluid line arrangement has a cavity accessible for a fluid via a bore in a first wall element. A spacer element for the fluid line arrangement has a resilient clamping sleeve which can be introduced through the bore. The clamping sleeve has a first longitudinal section which is provided so as to remain in the bore in contact with the bore wall and a second longitudinal section which is set back from the first longitudinal section by way of at least one notch which runs transversely with respect to a longitudinal axis of the clamping sleeve. The second longitudinal section is configured as an axially slotted tube which serves as the spacer element, the borders of the slot being bent radially outwards.

20 Claims, 1 Drawing Sheet

(51) Int. Cl.
*F01M 11/02* (2006.01)
*F01M 9/10* (2006.01)
*F01L 1/047* (2006.01)

(52) U.S. Cl.
CPC ...... *F01M 11/02* (2013.01); *F01L 2001/0475* (2013.01); *F01L 2810/02* (2013.01)

(58) Field of Classification Search
USPC ........................................... 123/90.12, 90.13
See application file for complete search history.

(56) References Cited

U.S. PATENT DOCUMENTS

| | | | |
|---|---|---|---|
| 5,881,692 | A | 3/1999 | Lassanske |
| 6,138,631 | A | 10/2000 | Stromsky et al. |
| 6,253,727 | B1 | 7/2001 | Tosaka et al. |
| 9,068,477 | B2 * | 6/2015 | Fabros ............... F01L 1/14 123/90.12 |

FOREIGN PATENT DOCUMENTS

| | | |
|---|---|---|
| DE | 40 19 766 A1 | 1/1992 |
| DE | 10 2007 024 133 A1 | 12/2007 |
| DE | 198 14 837 B4 | 12/2007 |
| EP | 0 377 829 A2 | 7/1990 |
| GB | 2 063 415 A | 6/1981 |
| JP | 2911463 B2 | 6/1999 |
| JP | 4244245 B2 | 3/2009 |

OTHER PUBLICATIONS

German-language Written Opinion (PCT/ISA/237) issued in PCT Application No. PCT/EP2014/073542 dated Feb. 12, 2015 (five pages).

German Search Report issued in counterpart German Application No. 10 2013 223 018.4 dated May 26, 2014 with partial English translation (12 pages).

Chinese-language Office Action issued in counterpart Chinese Application No. 201480047708.0 dated May 15, 2017 (Five (5) pages).

* cited by examiner

DRIVE UNIT, INTERNAL COMBUSTION ENGINE, SPACER ELEMENT FOR A FLUID LINE ARRANGEMENT, AND TOOL KIT FOR MOUNTING A SPACER ELEMENT

CROSS REFERENCE TO RELATED APPLICATIONS

This application is a continuation of PCT International Application No. PCT/EP2014/073542, filed Nov. 3, 2014, which claims priority under 35 U.S.C. § 119 from German Patent Application No. 10 2013 223 018.4, filed Nov. 12, 2013, the entire disclosures of which are herein expressly incorporated by reference.

BACKGROUND AND SUMMARY OF THE INVENTION

The present invention relates to a drive unit, in particular an internal combustion engine, having a fluid line arrangement, in particular an oil line arrangement, wherein the fluid line arrangement has at least one cavity with a spacer element which ensures the maintenance of a minimum distance between a first wall element and a second wall element of the cavity. The cavity is accessible for a fluid via a bore in the first wall element. The invention also relates to a spacer element for a fluid line arrangement having a cavity adjoined by a first wall element and a second wall element, wherein the first wall element has a bore which leads into the cavity and through which a fluid can flow. The invention also relates to a tool kit for mounting a spacer element.

Drive units, for example internal combustion engines, have fluid line arrangements through which fluids serving, for example, for cooling and/or lubricating the drive unit are conducted. The fluid line arrangement also includes, for example, a hollow camshaft through which the engine oil fluid flows. Various cavities are produced in the camshaft by various wall elements. For example, a stopper at one end of the camshaft forms a first wall element, and an oil cover spaced apart from the stopper forms a second wall element, and therefore a cylindrical cavity is formed between the first wall element and the second wall element in the hollow camshaft. A radial bore through the camshaft wall and an axial bore through the stopper lead into the cavity. Engine oil can flow through the cavity via the bore, and the entire arrangement consequently constitutes a fluid line arrangement. The wall elements can be fastened in various ways. They can, for example, can be screwed in, adhesively bonded in or pressed in. Under the circumstance that a force directed in the direction of the first wall element acts on the second wall element, the position of the second wall element can be fixed by a spacer element which absorbs the force. Drive units provided for mass production and the fluid line arrangements thereof have to be able to be produced cost-effectively and they have to reliably carry out the function thereof by ensuring a minimum distance in a cavity. The spacer element is suitable, inter alia, also for retrofitting. In this case, suitable tools are also required for mounting the spacer element.

It is consequently the object of the present invention to provide a drive unit having a fluid line arrangement with a cavity, which can be produced cost-effectively and which reliably carries out the function thereof; it is also the object of the invention to provide a cost-effective and reliable spacer element for the fluid line arrangement of the drive unit and a tool kit for mounting the spacer element.

These and other objects are achieved by a drive unit of the generic type defined above and by an internal combustion engine, which is characterized in that the fluid line arrangement has a resilient clamping sleeve which can be introduced through the bore, wherein the clamping sleeve has a first length portion which is provided in the bore in a manner remaining in contact with the bore wall, and a second length portion which is set back from the first length portion by at least one notch running transversely with respect to a longitudinal axis of the clamping sleeve. The second length portion is designed as an axially slotted tube, the borders of the slot being curved radially outward, and serves as a spacer element.

The clamping sleeve has approximately the form of a cylindrical shell. The clamping sleeve is divided along a longitudinal axis thereof by a notch into a first length portion and a second length portion. The length portion of the clamping sleeve in which the notch is located is assigned to the first length portion. The first length portion is provided in the bore. By contrast, the second length portion, which has the length of the minimum distance to be maintained, is provided in the cavity as a spacer element.

The clamping sleeve has good mechanical stability because of the partially cylindrical shape thereof and can be produced simply and cost-effectively. The outer circumference of the clamping sleeve can be reduced by pressure against the cylindrical shell walls, and therefore the clamping sleeve can be introduced into the bore of the first wall element and pushed through the bore until only the first length portion is still inserted in the bore and the second length portion extends into the cavity located to the rear of the bore. The second length portion relaxes in the cavity because of the resilient or elastic property of the clamping sleeve, and increases its circumference. Edges, which are formed by the notch, of the borders of the slot of the second length portion engage as a result of the radially outwardly directed elastic relaxation behind surface regions of the first wall element that are located next to the bore. In various exemplary embodiments, the slot borders are curved differently radially outward, for example as a plane running outward tangentially from the cylinder or as a surface which is arched convexly outward in the form of a groove and has a larger radius of curvature than that of the cylinder. By means of the radially outwardly curved slot borders, the clamping sleeve, once introduced and relaxed in the second length portion thereof and therefore fitted, can no longer be pushed back through the bore.

According to an advantageous refinement of the drive unit according to the invention, the clamping sleeve is formed from sheet metal, wherein the sheet metal is composed of stainless steel. Sheet metal can be processed in a simple manner, for example by punching and bending, and therefore, when the starting materials used are sheet metal, the clamping sleeves can be produced simply and cost-effectively. In some exemplary embodiments of the invention, use is made of other suitable starting materials, for example tubes. Steels have good elastic properties which are maintained even at higher temperatures. In addition, stainless steels have a high corrosion resistance, and therefore corrosion, for example due to condensation water which occasionally occurs, does not constitute a problem. However, in some exemplary embodiments, aluminum sheets, nickel sheets or copper sheets are used.

In an advantageous exemplary embodiment of the invention, the first length portion of the clamping sleeve has an axial slot, wherein the diameter of the clamping sleeve is of such a size that the first length portion of the clamping sleeve, which length portion is located in the bore, is compressively stressed. By means of the compressive stressing, the first length portion fits closely against the wall of the bore. As a result, the clamping sleeve is clamped in the bore in a manner free from play. In alternative exemplary embodiments, for example if the clamping sleeve is manufactured from a tube, the first length portion does not have an axial slot.

According to an advantageous aspect of the drive unit according to the invention, outer corners of the slot edges that are located on the outside of the clamping sleeve and in the second length portion are curved radially inward. When the clamping sleeve is introduced into the bore, the inwardly curved slot edges cause the front end of the clamping sleeve to be pointed, and therefore the clamping sleeve can easily be introduced into the bore.

A further advantageous aspect of drive units according to the invention is that the second length portion of the clamping sleeve has perforations through which the fluid can flow. It is always ensured by the slot in the second length portion that the fluid can flow through the cavity, the clamping sleeve and the bore. The perforations bring about a reduction of the flow resistance caused by the clamping sleeve, and therefore the clamping sleeve ultimately no longer presents any significant flow resistance.

In a further advantageous partial aspect of the invention, outer corners of the clamping sleeve are rounded. During the mounting of the clamping sleeve, the round corners reduce the risk of the clamping sleeve being hung up at an edge or the like. Rounded outer corners, past which the fluid flows, for example outer corners located on the notch, are also more advantageous in terms of flow than sharp-edged outer corners.

According to a further advantageous aspect of drive units according to the invention, at least one round internal angle is formed at one end of the notch of the clamping sleeve. During elastic deformation of the clamping sleeve, sharp internal angles are subject to a greater mechanical loading than other parts of the clamping sleeve. By means of the internal angles of rounded design, the risk of material overloading and cracking, which is associated therewith and originates from an internal angle, is reduced.

In yet another advantageous detail of the invention, a protrusion extending into the second length portion is formed at one end of the notch of the clamping sleeve. In the mounted state of the clamping sleeve, the ends of the notches are located on the cavity-side edge of the bore of the first wall element. Punctiform concentrations of mechanical stresses in the clamping sleeve are avoided by the protrusions which extend into the second length portion. In addition, the protrusions constitute perforations through which the fluid can flow.

In a second aspect, the object of the invention is achieved by an internal combustion engine having an oil line arrangement as a concrete form of the generic type mentioned at the beginning, wherein the internal combustion engine has characterizing features of at least one drive unit according to the invention.

In a third aspect, the object of the invention is achieved by a spacer element of the generic type defined at the beginning, which is designed as a clamping sleeve, as is described in conjunction with at least one drive unit according to the invention. This clamping sleeve is a simple and cost-effective component which reliably fulfils the object of the invention.

In a third aspect, the object of the invention is achieved by a tool kit for mounting a spacer element in a drive unit, which tool kit is designed for a spacer element according to the invention and has a prestressing tool and a pressing-in tool, wherein the prestressing tool has a bore which has a diameter which is the same size as or is smaller than the bore in the first wall element, and where the pressing-in tool has a pressing-in cylinder, the diameter of which is of such a size that the pressing-in cylinder can be introduced into the bore of the prestressing tool in a manner substantially free from play.

By using the tool kit according to the invention, particularly simple manual mounting of the clamping sleeve in the drive unit or in the internal combustion engine is possible. The clamping sleeve is provided in a prestressed manner in the bore of the prestressing tool such that the clamping sleeve can be introduced into the bore of the first wall element with or without play and without further compression. The pressing-in cylinder, which can also be a hollow cylinder, can be pushed into the prestressing tool, and therefore the clamping sleeve can be pushed by the pressing-in cylinder through the prestressing tool and through the first wall element. The pressing-in cylinder is designed to be sufficiently stable that the stiction forces produced by the tensioned clamping sleeve can be overcome.

In advantageous refinements of the tool kit according to the invention, the prestressing tool has a clamping sleeve guide tube which can be introduced into the bore of the first wall element, and/or the pressing-in tool has a guide cylinder which can be introduced into a clamping sleeve which is prestressed in the prestressing tool. The clamping sleeve guide tube makes it possible for the prestressing tool to be positioned smoothly and without tilting on the first wall element. The guide cylinder which is arranged concentrically on the pressing-in cylinder guarantees that end edges of the clamping sleeve bear securely against the radial border of the pressing-in cylinder and mutually centered alignment of clamping sleeve, pressing-in cylinder and bore of the prestressing device. The axially rear end of the pressing-in tool, which end lies opposite the guide cylinder located axially at the front can be designed as a contact surface with which the clamping sleeve can first of all be pushed into the prestressing sleeve located on the first wall element before the clamping sleeve is pushed by the pressing-in cylinder, after rotation of the pressing-in tool, further through the prestressing tool and the first wall element.

In a preferred embodiment of the tool kit according to the invention, the prestressing tool and the pressing-in tool have stops. The stops are dimensioned in such a manner that, when the clamping sleeve is correctly fitted, the stop of the prestressing tool strikes against the first wall element and the stop of the pressing-in tool strikes against the prestressing tool. Axial displacement of the clamping sleeve to the correct distance is therefore ensured at the same time as the prestressing tool and pressing-in tool are pushed in fully. The stops are preferably cylindrical with a readily handleable diameter. In an alternative embodiment, instead of the stops, there are merely markings, the position of which is checked visually.

According to an advantageous development of the tool kit according to the invention, the latter has a test gauge for determining the position of the second wall element. The test gauge has a test sleeve and a test pin which is displaceable in the test sleeve and can be pushed completely into the test sleeve when the second wall element is in the correct position. It can be tested with the test gauge, prior to mounting of the clamping sleeve, whether the second wall element is fastened at the correct position and therefore the clamping sleeve can be mounted. The position of the second wall element can alternatively also be determined differently, for example with a measuring gauge. However, the use of the test gauge is preferred since the latter is manufactured at the correct length, and therefore measuring errors, for example due to erroneous reading or skewed introduction, are prevented and the clamping sleeve can ultimately be mounted rapidly.

It is obvious to a person skilled in the art in the field of the invention that the various refinement possibilities which are presented may be combined differently with one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
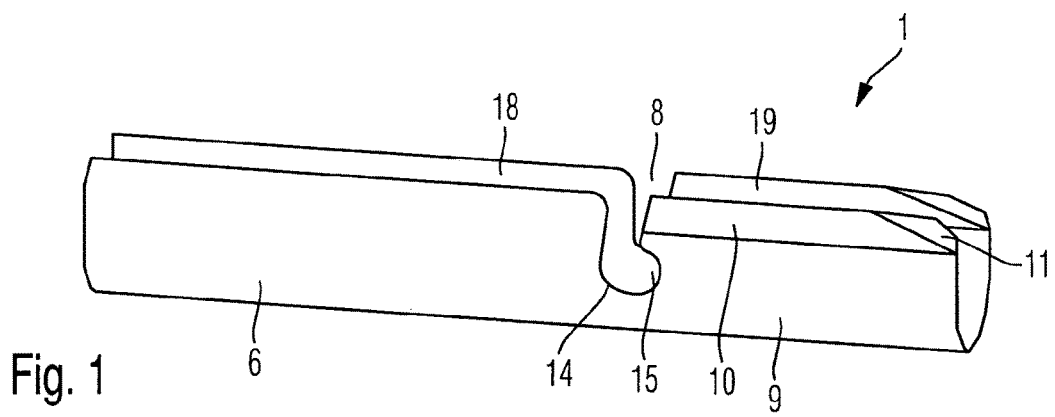
FIG. 1 illustrates a clamping sleeve according to an embodiment of the invention, the second length portion of which is provided as a spacer element.

FIG. 1 shows, purely schematically, an exemplary embodiment of a clamping sleeve 1 which is usable as a spacer element in a fluid line arrangement of a drive unit according to the invention. The clamping sleeve 1 is composed of a stainless steel sheet curved in the shape of a cylindrical shell. A first length portion 6 is integrally connected to a second length portion 9, wherein two notches 8 define the end of the first length portion 6. In the exemplary embodiment illustrated, the first length portion 6 has an axial slot 18, and the second length portion 9 has an axial slot 19. In the second length portion 9, the axial slot 19 is adjoined by slot borders 10 of the clamping sleeve 1, 1'. The slot borders 10 are curved radially outward deviating from an ideal cylindrical shell shape.

Figure 3:
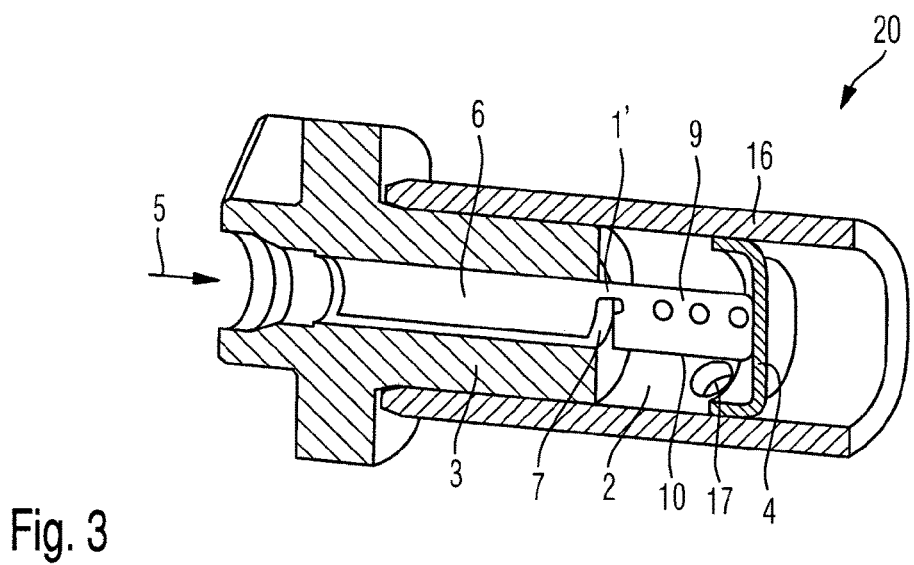
FIG. 3 illustrates a fluid line arrangement of a drive unit according to an embodiment of the invention.

When the first length portion 6 of the clamping sleeve 1 is pushed, as sketched in FIG. 3, into a bore 5, the diameter of which is virtually identical to the diameter of the clamping sleeve 1, 1', and the second length portion 9 protrudes out of the bore 5, the slot borders 10 are supported on the first wall element 3 next to the bore 5. As a result, the second length portion 9 of the clamping sleeve, which length portion protrudes out of the bore 5, cannot be pushed into the bore 5, and the second length portion 9 correspondingly fulfils the function thereof as a spacer element.

The outer corners 11 of the clamping sleeve 1 that are located at the end of the slot 19 are curved radially inward, and therefore the clamping sleeve 1 is pointed on the side thereof illustrated on the right and consequently can be introduced in a simple manner into a bore 5 or into a bore of a prestressing tool.

The clamping sleeve 1 has two notches 8 arranged transversally with respect to the longitudinal axis A of the clamping sleeve on both sides of the axial slot 18. By contrast, there is only one notch 8 in the case of an unslotted first length portion 6 (not illustrated). The ends of the notches 8 are not designed as sharp internal edges, but rather as a round internal angle 14 in the first length portion 6 and as a protrusion 15 in the second length portion 9. By avoiding sharp edged internal edges, the clamping sleeve 1, 1' is a reliable component in which cracking due to material fatigue does not occur.

Figure 2:
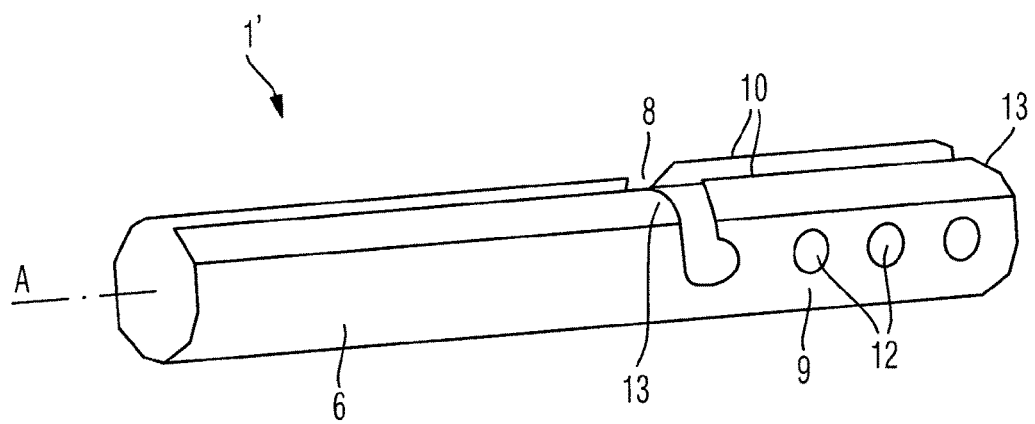
FIG. 2 illustrates a clamping sleeve according to another embodiment of the invention, the second length portion of which is provided as a spacer element.

FIG. 2 schematically shows a clamping sleeve 1' which is assigned to exemplary embodiments of the invention and which is illustrated in a somewhat different perspective than the clamping sleeve 1 in FIG. 1. The clamping sleeve 1' in FIG. 2 is very similar to the clamping sleeve 1 in FIG. 1. In order to avoid repetitions, reference is made to the description of FIG. 1 for identical or similar parts of the clamping sleeve 1, 1'. A difference between the clamping sleeves 1' and 1 resides in the perforations 12 via which a fluid can flow radially into or out of the clamping sleeve. The perforations, if arranged in surface regions in which the second length region is expanded radially, may lead to undesirable material weakening, and therefore some exemplary embodiments (not illustrated) have fewer perforations than the exemplary embodiment illustrated in FIG. 2. A further difference resides in the fact that the rounded outer edges 13 which are located on the outside on the right in the illustration, are not curved radially inward. Rounded outer edges 14 adjoining the notch 8 simplify the pushing of the first length portion 6 of the clamping sleeve 1, 1' into the bore 5.

FIG. 3 is a sectional illustration along the axis A of the clamping sleeve 1, 1' schematically showing a detail of a fluid line arrangement 20 of a drive unit according to the invention or of an internal combustion engine according to the invention. In the fluid line arrangement, the clamping sleeve 1' described with reference to FIG. 2 is inserted as a spacer element. The fluid line arrangement 20 has a first wall element 3 which, in the exemplary embodiment illustrated, is a stopper at one end of a hollow camshaft 16. A second wall element 4, which, in the specific exemplary embodiment, is an oil cover, is arranged within the camshaft 16. The second length portion 9 of the clamping sleeve 1' is mounted between the first wall element 3 and the second wall element 4. By contrast, the first length portion 6 of the clamping sleeve 1' is clamped into the bore 5 on the bore wall 7 in the first wall element 3. An oil flow from the bore 17 into the cavity 2 and then through the clamping sleeve 1' and the bore 5 is provided in the fluid line arrangement 20. The slot borders 10, which are curved radially outward here as a tangential plane, are supported on the first wall element 3 next to the bore 5. As a result, the clamping sleeve 1' cannot be pushed from the right to the left through the bore 5. The second length portion 9 of the clamping sleeve 1' thereby acts as a spacer element which prevents a movement of the second wall element 4 into the cavity 2 and therefore ensures that the bore 17 remains free.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit, comprising:
   a fluid line arrangement having a cavity, the cavity having a first wall element with a bore and a second wall element;
   a resilient clamping sleeve configured to be introduced through the bore in the first wall element, wherein
   the resilient clamping sleeve has a first length portion and a second length portion set back from the first length portion via at least one notch that runs transversely with respect to a longitudinal axis of the resilient clamping sleeve, the first length portion of the clamping sleeve is configured to remain in the bore in contact with a bore wall, the second length portion is configured as a tube with an axial slot having borders, the borders of the axial slot being curved radially outward, the second length portion serving as a spacer element to maintain a defined distance between the first wall element and the second wall element of the cavity, the cavity being accessible for a fluid via the bore in the first wall element.

2. The drive unit according to claim 1, wherein the drive unit is an internal combustion engine.

3. The drive unit according to claim 2, wherein the fluid line arrangement is an oil line arrangement.

4. The drive unit according to claim 1, wherein the resilient clamping sleeve is formed from sheet metal, the sheet metal being made of stainless steel.

5. The drive unit according to claim 1, wherein
the first length portion of the clamping sleeve has an axial slot,
a diameter of the resilient clamping sleeve being defined such that the first length portion located in the bore is compressively stressed.

6. The drive unit according to claim 1, wherein outer corners of the borders of the axial slot located on an outer end of the resilient clamping sleeve in the second length portion are curved radially inward.

7. The drive unit according to claim 1, wherein the second length portion of the resilient clamping sleeve has perforations through which the fluid is flowable.

8. The drive unit according to claim 1, wherein outer corners of the resilient clamping sleeve are configured as rounded outer corners.

9. The drive unit according to claim 1, wherein one end of the at least one notch of the resilient clamping sleeve has at least one round internal angle.

10. The drive unit according to claim 1, wherein a protrusion that extends into the second length portion is formed at one end of the at least one notch of the resilient clamping sleeve.

11. A spacer element for a fluid line arrangement having a cavity adjoined by a first wall element and a second wall element, the first wall element having a bore leading into the cavity and through which a fluid is flowable, wherein the spacer element comprises:
a resilient clamping sleeve configured to be introduced through the bore in the first wall element, wherein
the resilient clamping sleeve has a first length portion and a second length portion set back from the first length portion via at least one notch that runs transversely with respect to a longitudinal axis of the resilient clamping sleeve,
the first length portion of the resilient clamping sleeve is configured to remain in the bore in contact with a bore wall,
the second length portion is configured as a tube with an axial slot having borders, the borders of the axial slot being curved radially outward,
the second length portion serving as a spacer element to maintain a defined distance between the first wall element and the second wall element of the cavity, the cavity being accessible for a fluid via the bore in the first wall element.

12. The drive unit according to claim 11, wherein the resilient clamping sleeve is formed from sheet metal, the sheet metal being made of stainless steel.

13. The drive unit according to claim 11, wherein
the first length portion of the resilient clamping sleeve has an axial slot,
a diameter of the resilient clamping sleeve being defined such that the first length portion located in the bore is compressively stressed.

14. The drive unit according to claim 11, wherein outer corners of the borders of the axial slot located on an outer end of the resilient clamping sleeve in the second length portion are curved radially inward.

15. The drive unit according to claim 11, wherein the second length portion of the resilient clamping sleeve has perforations through which the fluid is flowable.

16. The drive unit according to claim 11, wherein outer corners of the resilient clamping sleeve are configured as rounded outer corners.

17. A toolkit for mounting a spacer element according to claim 11 in a drive unit, the spacer element being configured for the fluid line arrangement having the cavity adjoined by the first wall element and the second wall element, the first wall element having the bore leading into the cavity and through which the fluid is flowable,
wherein the toolkit comprises:
a prestressing tool and a pressing-in tool, wherein
the prestressing tool has a bore with a diameter of a same size or smaller than the bore in the first wall element, and
the pressing-in tool has a pressing-in cylinder with a diameter of a size such that the pressing-in cylinder is introducible into the bore of the prestressing tool in a manner substantially free from play.

18. The toolkit according to claim 17, wherein
the prestressing tool has a clamping sleeve guide tube introducible into the bore of the first wall element, and/or
the pressing-in tool has a guide cylinder introducible into the resilient clamping sleeve prestressed in the prestressing tool.

19. The toolkit according to claim 17, wherein
the prestressing tool and the pressing-in tool have stops,
the stops are dimensioned such that, when the resilient clamping sleeve is correctly fitted, a stop of the prestressing tool strikes against the first wall element and a stop of the pressing-in tool strikes against the prestressing tool.

20. The toolkit according to claim 17, further comprising:
a test gauge that determines a position of the second wall element, wherein
the test gauge has a test sleeve and a test pin displaceable in the test sleeve,
the test pin is pushable completely into the test sleeve when the second wall element is in the correct position.

* * * * *